United States Patent
Kumar et al.

(10) Patent No.: US 9,045,355 B2
(45) Date of Patent: Jun. 2, 2015

(54) NUTRIENT RECOVERY PROCESS

(71) Applicant: Anaergia Inc., Burlington (CA)

(72) Inventors: Ashwani Kumar, Mississauga (CA); Juan Carlos Josse, Mission Viejo, CA (US)

(73) Assignee: ANAERGIA INC., Burlington (CA)

( * ) Notice: Subject to any disclaimer, the term of this patent is extended or adjusted under 35 U.S.C. 154(b) by 0 days.

(21) Appl. No.: 13/832,737

(22) Filed: Mar. 15, 2013

(65) Prior Publication Data

US 2014/0263100 A1    Sep. 18, 2014

(51) Int. Cl.
| | |
|---|---|
| C02F 11/04 | (2006.01) |
| C02F 11/12 | (2006.01) |
| C05F 11/08 | (2006.01) |
| C05F 3/00 | (2006.01) |
| C05F 7/00 | (2006.01) |
| C05F 9/00 | (2006.01) |
| C02F 1/20 | (2006.01) |

(52) U.S. Cl.
CPC . *C02F 1/20* (2013.01); *C02F 11/12* (2013.01); *C02F 11/04* (2013.01); *C02F 11/121* (2013.01); *C02F 2209/14* (2013.01)

(58) Field of Classification Search
USPC .............. 71/8, 9, 10, 11, 12, 21, 25; 210/601, 210/605, 770
See application file for complete search history.

(56) References Cited

U.S. PATENT DOCUMENTS

| | | | | |
|---|---|---|---|---|
| 5,593,590 | A * | 1/1997 | Steyskal | 210/603 |
| 6,299,774 | B1 * | 10/2001 | Ainsworth et al. | 210/603 |
| 6,368,849 | B1 * | 4/2002 | Norddahl | 435/262 |
| 6,464,875 | B1 * | 10/2002 | Woodruff | 210/603 |
| 6,569,332 | B2 * | 5/2003 | Ainsworth et al. | 210/603 |
| 6,692,642 | B2 * | 2/2004 | Josse et al. | 210/605 |
| 6,866,779 | B1 * | 3/2005 | Burke | 210/603 |
| 6,984,323 | B2 * | 1/2006 | Khudenko | 210/603 |
| 7,014,768 | B2 * | 3/2006 | Li et al. | 210/603 |
| 7,153,427 | B2 * | 12/2006 | Burke | 210/603 |
| 7,416,644 | B2 | 8/2008 | Bonde | |
| 7,731,850 | B2 * | 6/2010 | Choi et al. | 210/603 |
| 7,806,957 | B1 * | 10/2010 | Burke | 71/10 |
| 7,927,491 | B2 * | 4/2011 | Kotelko et al. | 210/602 |
| 2007/0297953 | A1 | 12/2007 | Kemp et al. | |
| 2010/0170845 | A1 * | 7/2010 | Baur | 210/607 |
| 2014/0033776 | A1 * | 2/2014 | Josse et al. | 71/10 |
| 2014/0144195 | A1 * | 5/2014 | Callendrello et al. | 71/10 |

FOREIGN PATENT DOCUMENTS

WO    2012109737 A1    8/2012

OTHER PUBLICATIONS

Constantine, Tim, "North American Experience with Centrate Treatment Technologies for Ammonia and Nitrogen Removal", 2006 WEFTEC Conference, pp. 5271-5281.

* cited by examiner

*Primary Examiner* — Wayne Langel
(74) *Attorney, Agent, or Firm* — Scott Pundsack; Borden Ladner Gervais LLP

(57) ABSTRACT

An apparatus for recovering nutrients from digestate comprises one or more solid-liquid separation steps, and dryer, an ammonia stripping device, and an evaporator. In a process, digestate is separated into a solids portion and a liquid portion. Ammonia is stripped from the liquid portion and converted into an ammonium solution or salt which may be used as, or blended with, a fertilizer product. At least part of the remaining liquid portion is concentrated to produce brine. The brine is mixed with the solids portion. The mixture is dried and may be used as, or blended with, a fertilizer product.

6 Claims, 1 Drawing Sheet

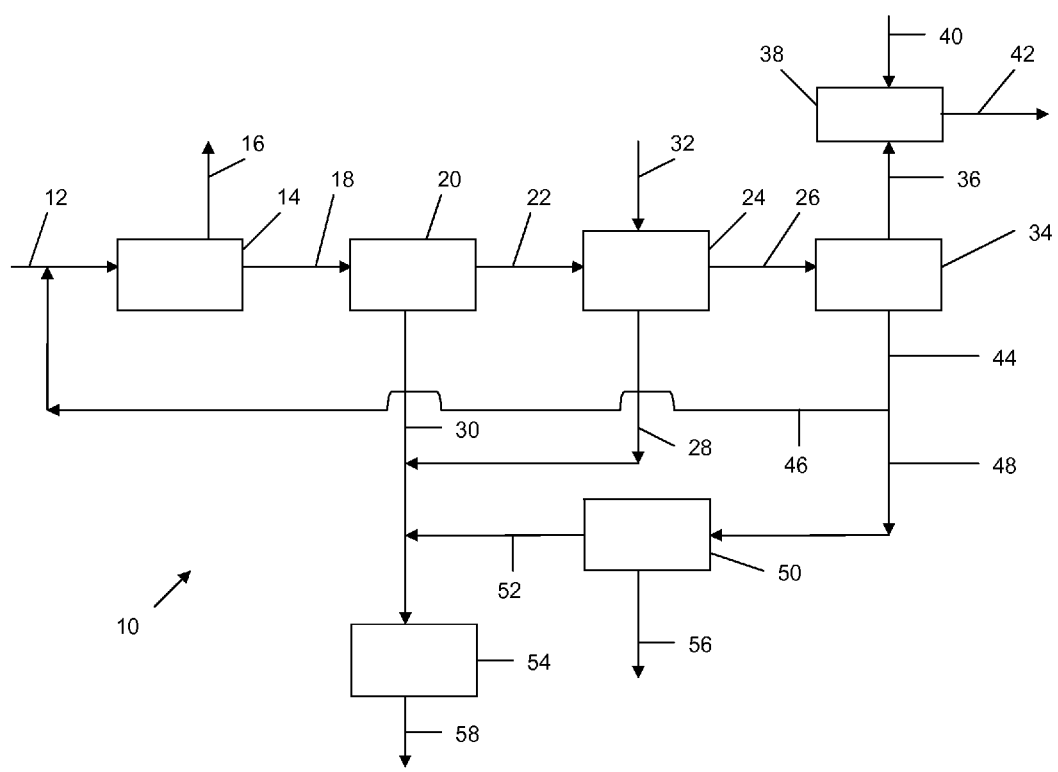

US 9,045,355 B2

NUTRIENT RECOVERY PROCESS

FIELD

This specification relates to anaerobic digestion, to the recovery of nutrients from waste biomass, and to a fertilizer product.

BACKGROUND

The following discussion is not an admission that anything discussed below is common general knowledge or citable as prior art.

Various organic waste products contain nutrients that make the waste potentially valuable as fertilizer. For example, some animal manures and organic sludges or slurries could be applied directly to land. However, due for example to the large quantities of material involved relative to the nutrient content, and potential problems with odors, this practice is limited to selected appropriate operations located near the source of the waste. The manure, sludge or slurry might be treated to remove large fibers, physically dewatered, partially dried thermally, extruded into a solid fertilizer product and then further thermally dried. However such a product would not be stable and would tend to decompose or attract mold during storage because of its high biodegradable organic matter content. Alternatively, manures, sludges or slurries could be digested in an anaerobic digester to produce a biogas. The digested sludge could then be applied to the land as a fertilizer. While the biogas produced is useful as a fuel, use of the digester sludge as a fertilizer is still limited to selected appropriate operations near the source of the waste.

In an activated sludge wastewater treatment plant, ammonia is removed from the wastewater at least in jurisdictions with relevant discharge regulations. In these plants, waste activated sludge may be sent to an anaerobic digester. Sludge from the digester, comprising digestate, is typically de-watered before it is disposed or treated further. The liquid stream from the de-watering device, which may be called reject water, centrate or filtrate, is often returned to the main activated sludge process. This centrate contains ammonia, and there have been some attempts to remove ammonia from the centrate before it is sent back to the main process. A paper by Tim Constantine, presented at the 2006 WEFTEC conference and entitled "North American Experience with Centrate Treatment Technologies for Ammonia and Nitrogen Removal", provides a summary of ammonia removal technologies that have been used in North American facilities.

US Patent Application Publication Number 2007/0297953 to Kemp et al. describes a system in which ammonia is removed from water in a vacuum assisted flash stripping tower. The water is treated before stripping to remove solids and multivalent cations and increase its pH.

U.S. Pat. No. 7,416,644 to Bonde describes a fermenter with a side stream ammonia stripping step. Ammonia is stripped from fermented biomass in a shunt. Effluent from the fermenter passes through the shunt while water vapor is injected into the shunt.

INTRODUCTION TO THE INVENTION

The following paragraphs are intended to introduce the reader to the more detailed description to follow, and not to limit or define any claimed invention.

In some applications of anaerobic digestion, the feedstock is rich in nutrients such as Nitrogen (N), Phosphorus (P) and Potassium (K). Nutrients within the feedstock are maintained through the digestion process. The nutrients are concentrated on a dry mass basis in the digestate because a portion of the volatile solids in the feedstock is consumed by anaerobic bacteria during the digestion process and converted into biogas. However, a portion of the nutrients in the digestate is in the form of minerals or salts. For example, nitrogen is mostly contained as organic nitrogen in the feedstock but a large fraction of the nitrogen in the digestate is in the form of ammonia.

This specification describes a process and apparatus for recapturing one, or preferably more, nutrients contained in the feedstock in a form that is usable, for example as fertilizer. The nutrients are preferably concentrated in the recaptured form.

An apparatus for recovering nutrients from digestate comprises one or more solid-liquid separation steps, and dryer, an ammonia stripping device, and an evaporator. In a process, digestate is separated into a solids portion and a liquid portion. Ammonia is stripped from the liquid portion and converted into an ammonium solution or salt which may be used as, or blended with, a fertilizer product. At least part of the remaining liquid portion is concentrated to produce brine. The brine is mixed with the solids portion. The mixture is dried and may be used as, or blended with, a fertilizer product.

BRIEF DESCRIPTION OF THE FIGURES

FIG. 1 is a process flow diagram of a system for treating a feedstock with nutrient recovery.

DETAILED DESCRIPTION

FIG. 1 shows a system 10 for treating a feedstock 12. The feedstock 12 is typically a waste biomass. The feedstock 12 is treated first in an anaerobic digester 14. The digester 14 converts the feedstock 12 into biogas 16 and digestate 18. Biogas 16 may be used, typically after upgrading, in the system 10 or after being transferred out of the system 10. Examples of suitable feedstock 12 that result in high nutrient content digestate 18 include animal manure, post-consumer food waste, pre consumer food processing waste, biofuels processing by products, agricultural waste, and municipal wastewater sludge, among others. International Publication WO 2012/109737 is incorporated by reference.

The digester 14 can have one or more mixed closed tanks. The digester 14 is preferably operated, for example by using a high solids feedstock or recuperative thickening or both, such that the digestate 18 has a high total solids (TS) concentration, for example between 3 or 5 wt % and 9 wt %.

The nutrient recovery apparatus to be described below could be located separately from the anaerobic digester 14. However, when the nutrient recovery apparatus is co-located with the anaerobic digester 14, the need to move digestate 18 is reduced, the biogas or waste heat from power generation can be used in the nutrient recovery process, and a liquid stream may be advantageously returned to anaerobic digester 14.

The digestate 18 passes through at least one, but preferably two, solids separation stages. In the system 10, a first solid-liquid separation device 20 removes fibrous materials from the digestate 18. For example, the first solid-liquid separation device 20 may be a filter screw press, a screen or roller press, or another similar device. The first solid-liquid separation device 20 may have openings larger than 400 microns but smaller than 1000 microns. Filtrate 22 from the first solid-liquid separation device 20, alternatively called a reject, filtrate, centrate or pressate, may contain about 2 to 3 wt % total suspended solids (TSS). The first solid-liquid separation device 20 may optionally be omitted if there is not a significant concentration of fiberous solids in the digestate 18.

The filtrate 22 goes to a second solid-liquid separation device 24. The second solid-liquid separation device 24 may be, for example, a centrifuge, flocculating screw press, or similar device. One or more polymeric or mineral coagulants or flocculants may be added to the second solid-liquid separation device 24. Second filtrate 26 exiting the second solid-liquid separation device 24 preferably contains 0.2 wt % TSS or less. A cake 28 produced by the second solid-liquid separation device 24 is combined with fibrous solids 30 removed in the first solid-liquid separation device 20. The combined solids 28, 30 are rich in phosphorus and organic nitrogen, whereas the second filtrate 26 contains nitrogen (as ammonium) and potassium, both in solution.

Ammonia nitrogen is removed from the second filtrate 26 and concentrated to produce a nitrogen rich fertilizer product. The relative presence of ammonia ($NH_3$ gas) and ammonium ($NH_4+$ ion in solution) in the liquid of the digestate 18 is a function of pH and temperature. A larger fraction is present as unionized ammonia ($NH_3$ gas) with increased temperature and with increased pH.

The second filtrate 26 passes through an ammonia stripper 34. In one example, the second filtrate 26 is heated, for example to 60 to 80 degree C., and flows through one or more tanks or zones, for example 3 to 5 heat jacketed reactors, in series. Sub-surface low pressure air is bubbled into the heated second filtrate 26. In cold climates the subsurface air can be heated prior to entering the stripper 34. The air bubbles and elevated temperature first strips $CO_2$ from the second filtrate 26 resulting in a pH increase. The pH increase and elevated temperature in turn result in ionized ammonium in solution shifting to unionized ammonia gas. The elevated temperature also reduces ammonia solubility. Continued air bubbling then strips ammonia gas out of solution and into a mixed gas stream 36 comprising ammonia gas, air and evaporated moisture.

The mixed gas stream 36 flows to a gas scrubbing unit 38 in which ammonia is scrubbed from the mixed gas stream 36. The gas scrubbing unit 38 uses sulfuric acid 40 as an absorption liquid. The sulfuric acid 40 reacts with the ammonia gas and forms ammonium sulfate 42. Ammonium sulfate 42 is a useable nutrient product in liquid form at 28 to 40 wt % concentration. Alternatively, ammonium sulfate 42 can be further concentrated or dried to a crystal or salt form. Ammonium sulfate 42 can be used as a fertilizer product alone or in combination with other products.

In one example, the gas scrubbing unit 38 uses a counter flow column configuration with air circulating from the bottom up through a packed bed with plastic media to enhance gas/liquid mass transfer surface area. An acid shower with excess sulfuric acid 40 flows from the top down and reacts with the ammonia gas in the air stream to form ammonium sulfate 42. Ammonium sulfate 42 is stored in a sump at the bottom of the scrubber column. Ammonium sulfate 42 is pumped for recirculation and sulfuric acid 40 is added. Sulfuric acid addition is controlled automatically based on a pH set point.

Part of the stripped filtrate 44 leaving the ammonia stripper 34 can be used as dilution water 46, optionally after being de-aerated. Dilution water 46 is mixed with the feedstock 12. In the mesophilic and thermophilic range of digesters, operating at 35 to 55 degrees Celsius and at a pH of between 7.5 and 8.2, most of the reduced nitrogen exists as ammonium ions. Total ammonia concentrations are typically not allowed to exceed about 5000 ppm in mesophilic digesters and about 3000 ppm in thermopohilic digesters since the unionized ammonia fraction is toxic to methanogenic organisms. Therefore digesters for manures with high solids and high nitrogen content, such as digesters for poultry manure, are typically diluted.

Phosphorus and potassium that was not retained in the combined solids 28, 30 remains in stripped filtrate 44 and can be partially returned to the digester 14 in the dilution water 46. However, not all of the stripped effluent 44 is required for dilution water 46. Phosphorus and potassium is recovering from the excess filtrate 48 by blending the excess filtrate with the combined solids 28, 30.

Excess filtrate 48 preferably passes through a concentrator 50 before being mixed with the combined solids 28, 30. The concentrator 50 reduces the amount of water added to the combined solids 28, 30 while retaining phosphorus and potassium. Concentrated filtrate 52 leaving the concentrator 50 may be concentrated 6 or 7 times or more. The concentrated filtrate 52 may have a solids content of 20 wt % or more. The concentrator 50 may be, for example, one or more thermal evaporators. Thermal energy for evaporation can be supplied in a variety of ways such as burning natural gas. The concentrator 50 is preferably a multiple effect evaporator such that waste heat can be used to provide some of the thermal energy for drying. Waste heat may be taken from a combined heat and power unit burning the biogas 16, or exhaust from a dryer 54 used to dry the combined solids 28, 30 and concentrated filtrate 52 mixture. The concentrator 50 also produces an effluent 56, for example by condensing steam produced by evaporating the excess filtrate 48. Effluent 56 may be discharged or used in another device or process, optionally after further treatment steps.

The combined solids 28, 30 and concentrated filtrate 52 are sent through a drier 54 to remove moisture, preferably to a TS concentration of 90 wt % or more. Drier 54 is preferably an indirect drier. The drier 54 can be, for example, a hollow screw type dryer with steam or hot oil circulation, a disc type dryer or a press type dryer, etc. The drier 54 may use, for example, biogas, natural gas or electricity as an energy source to evaporate water from the combined solids 28, 30 and concentrated filtrate 52. The drier 54 may operate at a temperature of 100 degrees C. or more.

The dried product 58 is rich in phosphorus and potassium as well as non-volatile carbon. The dried product 58 can be used as a fertilizer along, or in a mixture with another fertilizer product.

We claim:
1. process comprising steps of,
  a) recovering solids and liquid from an anaerobic digester digestate;
  b) stripping ammonia from the liquid to produce an ammonia stripped liquid;
  c) concentrating at least some of the ammonia stripped liquid to produce a brine;
  d) mixing the brine with the solids; and,
  e) drying the brine and solids mixture.
2. The process of claim 1 wherein step a) comprises two solid-liquid separation steps.
3. The process of claim 1 wherein a first of the solid-liquid separation steps comprises removing fibers from the digestate.
4. The process of claim 1 wherein step b) comprises heating the liquid to at least 50 degrees C., flowing the ammonia through a series of sequential stages, and blowing bubbles of air into the liquid in the stages.
5. The process of claim 1 further comprising converting stripped ammonia to an ammonium sulfate solution or salt.

6. The process of claim 1 wherein at least some of the ammonia stripped liquid is returned to the digester.

\* \* \* \* \*